(12) United States Patent
McEldowney (10) Patent No.: US 7,763,841 B1
(45) Date of Patent: Jul. 27, 2010

(54) OPTICAL COMPONENT FOR A DEPTH SENSOR

(75) Inventor: Scott McEldowney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/472,941

(22) Filed: May 27, 2009

(51) Int. Cl.
G02B 27/42 (2006.01)
(52) U.S. Cl. .................. 250/216; 348/340; 359/340
(58) Field of Classification Search .......... 250/216; 359/558, 563; 348/335, 340
See application file for complete search history.

(56) References Cited

U.S. PATENT DOCUMENTS

| 5,122,903 | A | * | 6/1992 | Aoyama et al. | 359/565 |
|---|---|---|---|---|---|
| 5,718,496 | A | | 2/1998 | Feldman et al. | |
| 5,764,317 | A | | 6/1998 | Sadovnik et al. | |
| 5,812,226 | A | | 9/1998 | Izumi et al. | |
| 5,871,266 | A | | 2/1999 | Negishi et al. | |
| 6,825,980 | B2 | * | 11/2004 | Dickson et al. | 359/566 |
| 6,857,746 | B2 | | 2/2005 | Dyner | |
| 7,085,203 | B2 | * | 8/2006 | Shiono et al. | 369/44.32 |
| 2007/0019099 | A1 | * | 1/2007 | Lieberman et al. | 348/335 |
| 2007/0019103 | A1 | * | 1/2007 | Lieberman et al. | 348/344 |
| 2008/0266525 | A1 | | 10/2008 | Relke et al. | |
| 2008/0297614 | A1 | | 12/2008 | Lieberman et al. | |
| 2008/0309620 | A1 | | 12/2008 | Lieberman et al. | |
| 2008/0310284 | A1 | * | 12/2008 | Takada et al. | 369/112.07 |
| 2009/0046299 | A1 | * | 2/2009 | Menon et al. | 356/600 |
| 2009/0109534 | A1 | * | 4/2009 | Gurevich et al. | 359/558 |
| 2009/0174943 | A1 | * | 7/2009 | Takagi et al. | 359/558 |
| 2009/0190227 | A1 | * | 7/2009 | Yu | 359/619 |

OTHER PUBLICATIONS

Volkel, et al., "Miniaturization of Imaging Systems", Retrieved at <<http://www.suframa.gov.br/minapim/news/visArtigo.cfm?Ident=94&Lang=EN>>, Sep. 20, 2005, pp. 1-4.

* cited by examiner

*Primary Examiner*—John R Lee
(74) *Attorney, Agent, or Firm*—Alleman Hall McCoy Russell & Tuttle LLP (57) ABSTRACT

Embodiments are disclosed herein related to the construction of optical elements for structured light depth sensor systems. One disclosed embodiment provides a depth sensing system with an optical component comprising a first substrate surface, a first optical element formed in a polymer layer disposed on the first substrate surface, a second substrate surface, and a second optical element formed in a polymer layer disposed on the second substrate surface, wherein the second optical element is optically aligned with the first optical element. The depth sensing further comprises a projector configured to provide light to form a pattern to illuminate a target, and a sensor to acquire an image of the pattern.

19 Claims, 4 Drawing Sheets

OPTICAL COMPONENT FOR A DEPTH SENSOR

BACKGROUND

Image-based depth-sensors may be used in a variety of different environments. For example, an image-based depth sensor may be used with a video game system to allow players to interact with the video game system through the use of bodily gestures alone, without the use of hand-held motion sensors or the like to detect the gestures.

Some image-based depth sensors utilize structured light to measure the depth in an image. One embodiment of this system utilizes a projector to illuminate a target at some distance with a predefined light pattern. An image of this light pattern as reflected by the target is acquired via an image sensor, and distance or depth information is calculated from the distortion of the pattern relative to a known pattern at a known distance in the image.

A variety of methods may be used for creating a structured light pattern. For example, various combinations of lenses, diffusers, diffractive optics, and the like may be used in combination with a light source such as a laser to create a projector to illuminate a target. Likewise, various optical elements may be used to create an image of the pattern as reflected by the target onto a sensor to measure the depth of the target. For proper system performance, such optics must be very high quality and must be aligned to tight tolerances. This is a time consuming, labor intensive and costly manufacturing process.

SUMMARY

Accordingly, various embodiments are disclosed herein related to the construction of optical elements for structured light depth sensor systems. One disclosed embodiment provides a depth sensing system with an optical component comprising a first substrate surface, a first optical element formed in a polymer layer disposed on the first substrate surface, a second substrate surface, and a second optical element formed in a polymer layer disposed on the second substrate surface, wherein the second optical element is optically aligned with the first optical element. The depth sensing further comprises a projector configured to provide light to form a pattern to illuminate a target, and a sensor to acquire an image of the pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-I show an embodiment of a manufacturing process for making an optical component for a structured light depth sensing system.

DETAILED DESCRIPTION

The present disclosure relates to the manufacture of optical components for a structured light depth sensing system in such a manner as to enable large-scale processing with a high level of automation, through the use of lower cost techniques than the formation and alignment of separate glass or plastic lenses and such. For example, in the disclosed embodiments, optical elements are formed by embossing a layer of a curable polymer on a substrate. In some embodiments, a plurality of such elements are embossed onto a single substrate, which is then diced to form a plurality of separate optical components each including one or more optical elements to be used in different depth sensors. Furthermore, in some embodiments different optical elements are embossed onto different surfaces of a single substrate to form an optical component comprising a plurality of optical elements. The formation of the optical components via embossing, instead of grinding or molding or the like, may reduce the costs of manufacturing and assembling individual optical elements.

Furthermore, by forming a plurality of optical components on a single substrate, such optical components may be manufactured on a mass scale cost effectively. Additionally, by forming a plurality of optically aligned optical elements on different surfaces of a single substrate, a total number of optical components of an assembly of a depth sensing system may be reduced. Moreover, the number of air/substrate interfaces in the assembly of the depth sensing system may be reduced, which may improve performance of the depth sensing system. Additionally, the substrate material can be a rigid glass substrate which will provide better stability when these optical elements are exposed to a wide range of temperatures and other environmental conditions. Each of these features is described in more detail below.

Figure 1:
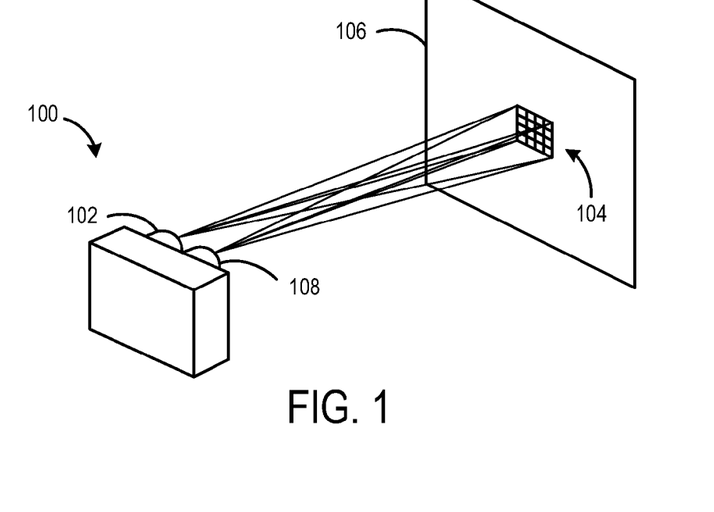
FIG. 1 is a schematic diagram of an embodiment of a structured light depth sensing system.

FIG. 1 is a schematic diagram of an embodiment of a structured light depth sensing system 100 (hereinafter referred to as "the depth sensing system"). The depth sensing system 100 comprises a projector assembly 102 configured to project a pattern 104 to illuminate a target 106, and a sensor assembly 108 that may be configured to focus pattern 104 to a sensor to acquire an image of pattern 104 in order to determine a depth of target 106. While these assemblies are depicted as being located within a single body, it will be understood that these components also may be located within separate bodies.

Figure 2:
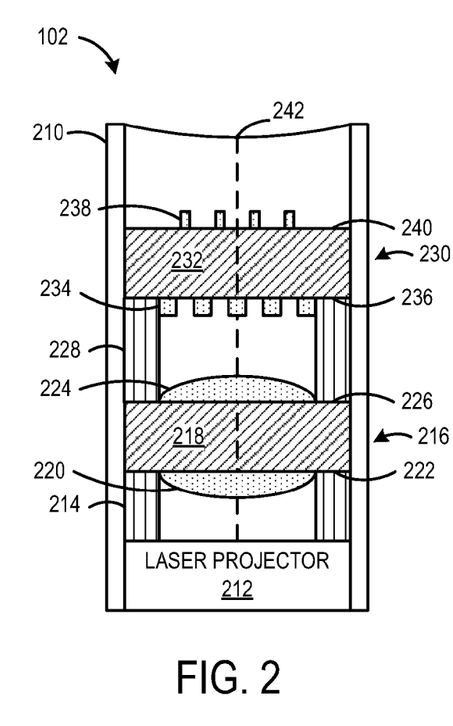
FIG. 2 is a schematic diagram of an embodiment of a projector assembly of the depth sensing system of FIG. 1.

FIG. 2 is a schematic diagram of one embodiment of a projector assembly 102 of FIG. 1. The projector assembly 102 may comprise a projector housing 210. In some embodiments, projector housing 210 may take a form of a barrel that houses a plurality of optical components that are stacked between spacers, while in other embodiments, the projector housing 210 may take any other suitable form. This housing can be manufactured such that the distance between the lens and the laser projector can be adjusted to create proper collimation. The projector assembly 102 also comprises a projector 212 configured to provide light for forming a structured light pattern. In some embodiments, projector 212 may take a form of a laser projector, while in other embodiments, the projector 212 may be configured to take the form of a light emitting diode (LED). In the depicted embodiment, a first spacer 214 is coupled to projector 212, and a first optical component 216 is coupled to first spacer 214. The first optical component 216 comprises a first substrate 218 and a first collimating lens 220 formed in a polymer layer disposed on a first substrate surface 222 of first substrate 218. A second collimating lens 224 may be formed in a polymer layer disposed on a second substrate surface 226 of first substrate 218. The first collimating lens 220 and second collimating lens 224 may be optically aligned in order to collimate light from projector 212. While depicted as a generic lens, it will be understood that the collimating lens 220 may comprise a Fresnel lens, or any other suitable type of lens.

Continuing with FIG. 2, a second spacer 228 is coupled to the second substrate surface 226, and a second optical component 230 is coupled to second spacer 228. Second optical component 230, as depicted, comprises a second substrate 232 having a third substrate surface 236 and a fourth substrate surface 240. A first diffractive optical element 234 is formed in a polymer layer disposed on third substrate surface 236, and a second diffractive optical element 238 is formed in a polymer layer disposed on fourth substrate surface 240. The first diffractive optical element 234 and/or the second diffractive optical element 236 each comprises a diffractive grating configured to form a structured light pattern in the form of a diffraction pattern when collimated coherent light is directed through the diffractive optical elements. As such, the first collimating lens 220, second collimating lens 224, first diffractive optical element 234, and second diffractive optical element 238 are optically aligned with one another along optical axis 242. However, it will be understood that any other suitable optical element or elements may be used to form a structured light pattern. For example, the projector assembly may include a substrate in which a diffuser is formed in a polymer layer disposed on a substrate surface of the substrate.

The first spacer 214 and the second spacer 228 are used to space optical elements (e.g., collimating lens, diffractive optical element, diffuser, etc.) at a correct spacing for proper optical performance, and to hold the optical elements in proper alignment. Therefore, in some embodiments, the spacers may be bonded to the optical components and/or the projector via a suitable adhesive or the like. It will be understood that, in other embodiments, any suitable number of spacers may be used to join and space any suitable number of optic elements.

It will further be appreciated that the above described projector assembly configuration is presented for the purpose of example, and is not intended to be limiting in any manner. For example, in some embodiments, a single substrate may include a collimating lens disposed on one surface of the substrate and a diffractive optical element disposed on another surface of the substrate. Further, a projector assembly may comprise any suitable number and type(s) of optical components for forming a desired structured light pattern.

Figure 3:
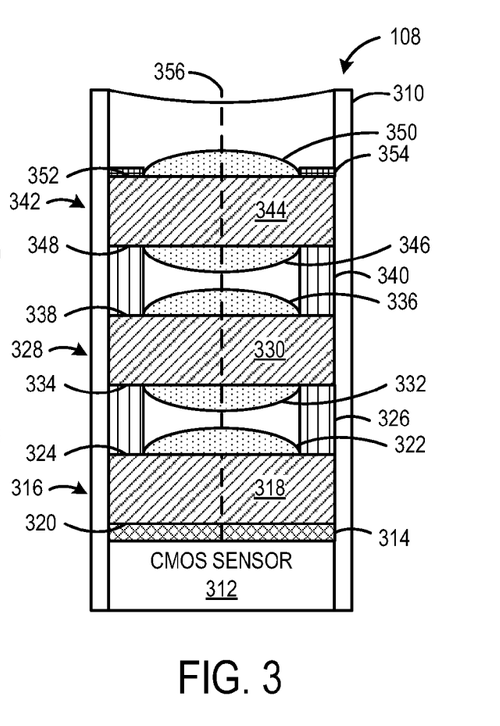
FIG. 3 is a schematic diagram of an embodiment of a sensor assembly of the depth sensing system of FIG. 1.

FIG. 3 is a schematic diagram of an embodiment of sensor assembly 108 of FIG. 1. As described above for projector assembly 102, sensor assembly 108 may comprise a sensor housing 310 in the form of a barrel that houses a plurality of optical components that are stacked between spacers. This housing can be manufactured such that the distance between the lens assembly and the sensor can be adjusted to create proper focus. The sensor assembly 108 also comprises an image sensor 312, such as a CMOS detector, configured to acquire an image of structured light pattern 104 as reflected from target 106 to determine a depth profile of target 106. In the depicted embodiment, a third substrate 318 is coupled to sensor 312. The third substrate includes a fifth substrate surface 320 and a sixth substrate surface 324. A band-pass filter 314 is formed on fifth substrate surface 320. The band-bass filter 314 may be configured to pass light in a wavelength range that corresponds to wavelength(s) emitted by projector 212. In some embodiments, band-pass filter 314 may be configured to pass infrared light. Band-pass filter 314 may be formed in any suitable manner. For example, in some embodiments, band-pass filter 314 comprises a plurality of layers of different dielectric materials. In some embodiments, the band-pass filter 314 may be positioned on a closest substrate surface or an adjacent substrate surface to sensor 312 in order to limit the range of angles seen by the sensor.

Continuing with FIG. 3, a first focusing lens is formed in a polymer layer disposed on sixth substrate surface 324. A third spacer 326 is coupled to sixth substrate surface 324 of third substrate 318, and a fourth optical component 328 is coupled to third spacer 314. In the depicted embodiment, the fourth optical component 328 comprises a seventh substrate surface 334 and an eighth substrate surface 338. A second focusing lens 332 is formed in a polymer layer disposed on seventh substrate surface 334, and a third focusing lens 336 is formed in a polymer layer disposed on eighth substrate surface 338 such that third focusing lens 336 is optically aligned with second focusing lens 332 and first focusing lens 322 along optical axis 356.

A fourth spacer 340 is depicted as being coupled to eighth substrate surface 338 of fourth substrate 330, and a fifth optical component 342 is coupled to fourth spacer 340. The fifth optical component 342 comprises a substrate 344 having a ninth substrate surface 348 and a tenth substrate surface 352. A fourth focusing lens 346 is formed in a polymer layer disposed on ninth substrate surface 348. Further, a fifth focusing lens 350 is formed in a polymer layer disposed on tenth substrate surface 352. The fifth focusing lens 350 is optically aligned with fourth focusing lens 346, third focusing lens 3336, second focusing lens 332, and first focusing lens 322 along an optical axis 346. An aperture 354 may be formed on tenth substrate surface 352. The aperture 354 may be configured to block light not traveling through fifth focusing lens 350 from entering sensor assembly 108.

It will be understood that the above described sensor assembly 108 is presented for the purpose of example, and that a sensor assembly 108 may have any other suitable configuration of optical elements and/or components. For example, a sensor assembly 108 may have either more or fewer lenses than that shown. Further, it will be appreciated that the band-pass filter may be differently positioned in the sensor assembly. For example, the band-pass filter may be formed on a different substrate surface than depicted. Further, the band-pass filter may be formed on a separate substrate than other optical elements. Additionally, the band pass filter and the first lens could be formed such that they replace the cover glass sometimes used on CMOS detectors.

Figure 4:
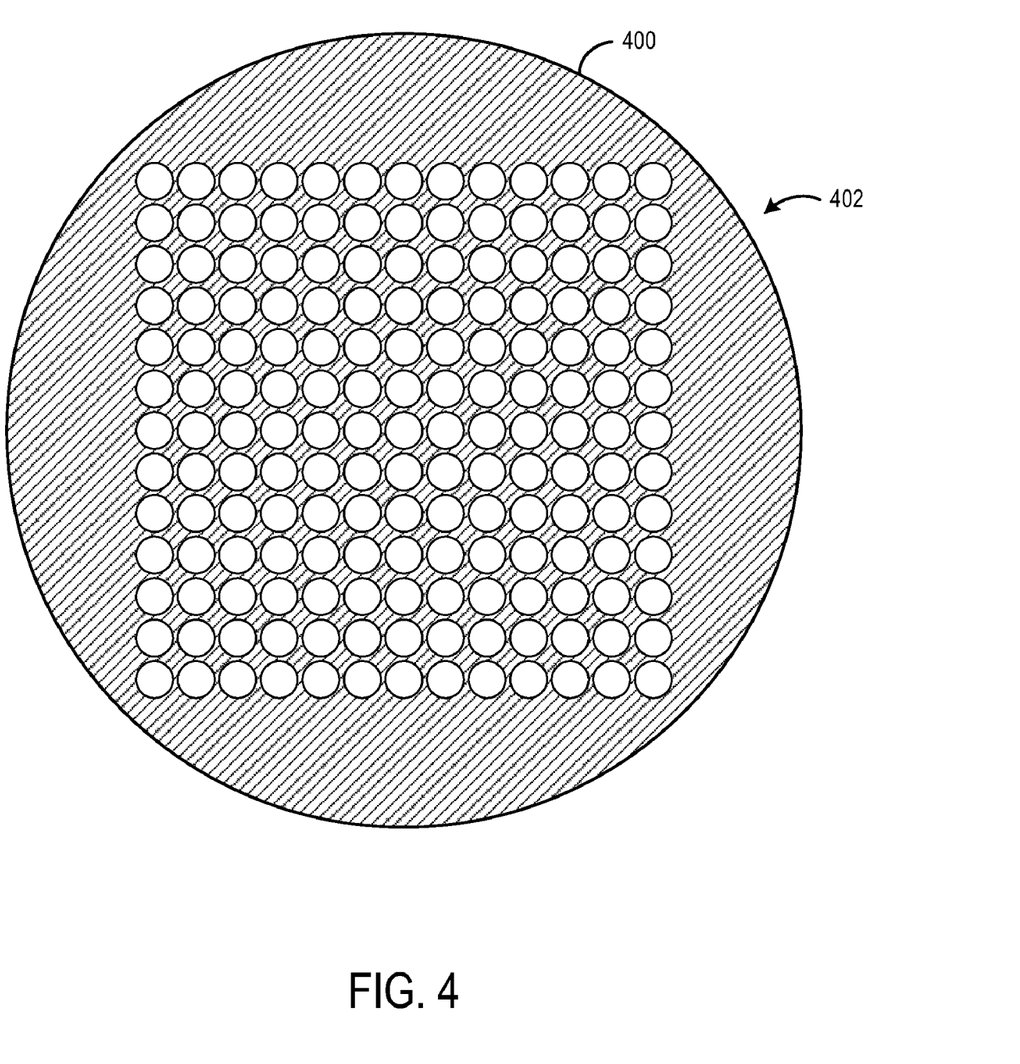
FIG. 4 is a front view of an embodiment of a substrate comprising a plurality of optical components for a structured light depth sensing system.

FIG. 4 is a front view of an embodiment of a substrate 400 in the form of an optically suitable wafer comprising a plurality of optical elements 402 formed thereon. In this manner, substrate 400 may be used to manufacture optical components for structured light depth sensing systems on a large scale, as opposed to individually. After formation of one or more optical components, substrate 400 may be diced to separate the optical elements 402, thereby forming a plurality of optical components for use in depth sensing systems. Further, in some embodiments, a plurality of substrates, each with a plurality of optical elements formed thereon, may be aligned and then bonded via a spacer structure located between the substrates before dicing. In this manner, a modular assembly of optical components, each comprising one or more optical elements, may be formed on a mass scale. This may simplify the formation and alignment of the assembly, as a single alignment process may be used to align a large number of optical components.

In some embodiments, substrate 400 may be formed from glass. By forming the substrate from glass, the optical components may have the dimensional properties of glass (e.g., dimensional stability) combined with the cost saving associated with using polymer to form the optical elements.

In some embodiments, a first plurality of optical elements may be formed on one surface of substrate 400 and a second plurality of optical elements may be formed on another surface of substrate 400 such that each of the second plurality of optical elements is optically aligned with a corresponding optical element of the plurality of optical elements. In this manner, the substrate may be diced to form a plurality of optical components, each comprising an optical element of the first plurality of optical elements an optical element of the second plurality of optical elements. It will be appreciated that any suitable number of optical elements may be formed on a substrate. Further, it will be appreciated that two or more different types of optical elements may be formed on the same substrate surfaces of a substrate.

As mentioned above, a plurality of substrates each comprising a plurality of optical elements (disposed on one or more surfaces of each substrate) may be optically aligned and separated by spacers to form a stack that may be diced to form optically aligned optical components as modular units. It will be appreciated that a modular unit may comprise one or more optical components. Accordingly, manufacturing of optical components for a depth sensing system may be simplified and/or automated relative to a manual manufacturing process where each optical element is individually placed and/or aligned in an assembly of a depth sensing system or a semi-automatic manufacturing process where each optical element is placed and/or aligned in an assembly of a depth sensing system in an automated manner. Moreover, a plurality of substrates with a plurality of optical components could also be assembled to a substrate containing a plurality of CMOS sensors thus making the whole assembly at the substrate scale, further reducing the manufacturing cost.

FIGS. 5A-I show an embodiment of a manufacturing process of an optical component. It will be understood that the manufacturing process may be performed at a wafer scale in which a plurality of substrates each comprising optical elements embossed on that substrate may be stacked and diced to form optical components. In this manner, each of the optical components may be coupled to a depth sensor assembly as a modular unit, thereby saving assembly time relative to the alignment of optical elements after manufacture of each element separately.

Figure 5A:
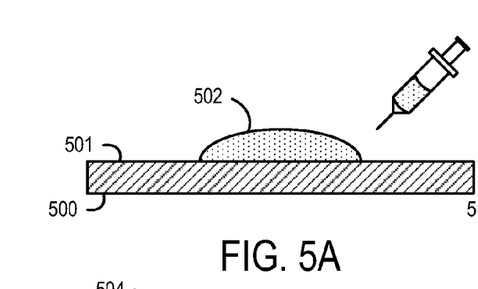

In FIG. 5A, a first amount 502 of ultraviolet light (UV) curable polymer is administered to a first substrate surface 501 of a substrate 500. In some embodiments, the first amount 502 of UV curable polymer may be injected onto the substrate surface. Next, in FIG. 5B, a first UV transparent optical feature embossing mold 504 is applied to the first amount of UV curable polymer. The depicted first UV transparent optical feature embossing mold 504 is configured to emboss a diffractive optical element 506 into the first amount 502 of UV curable polymer. In FIG. 5C, first UV transparent optical feature embossing mold 504 and the first amount 502 of UV curable polymer that is held in the form of diffractive optical element 506 are illuminated by UV light 508 to set diffractive optical element 506. In FIG. 5D, first UV transparent optical feature embossing mold 504 is separated from diffractive optical element 506 after diffractive optical element 506 has cured. In some embodiments, where an optical component comprises one optical element, the manufacturing process may end at this point.

Figures 5B, 5E:
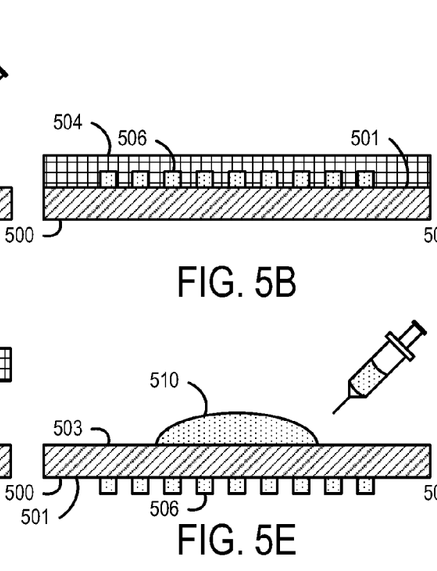
Figures 5C, 5F:
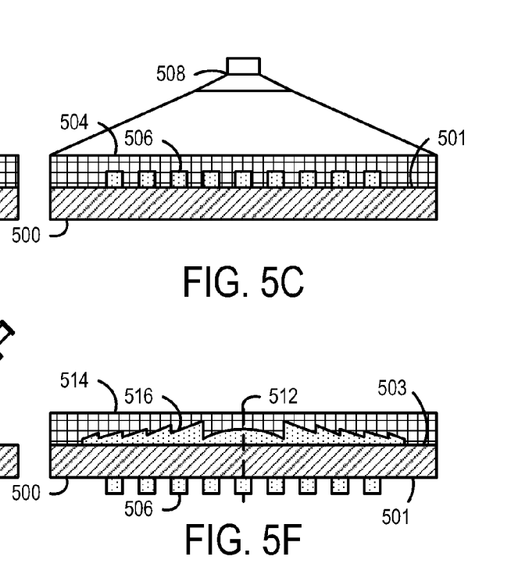
Figure 5D:
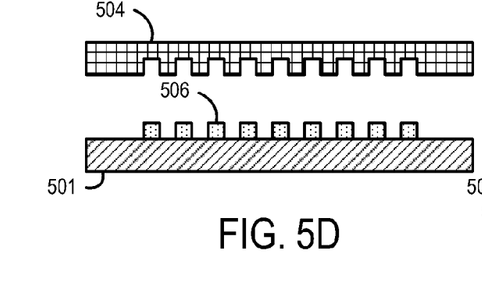
Figure 5G:
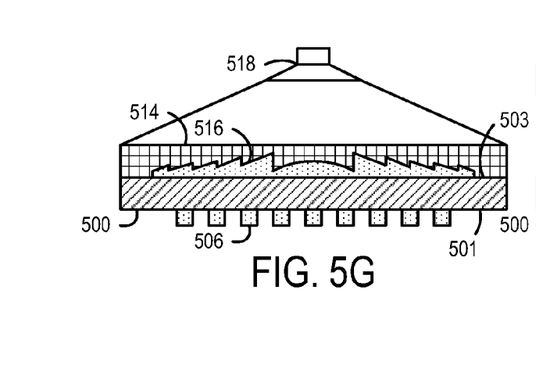
Figure 5H:
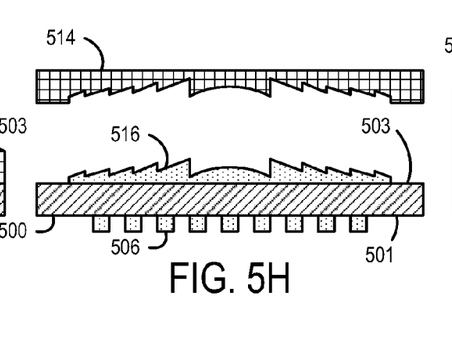
Figure 5I:
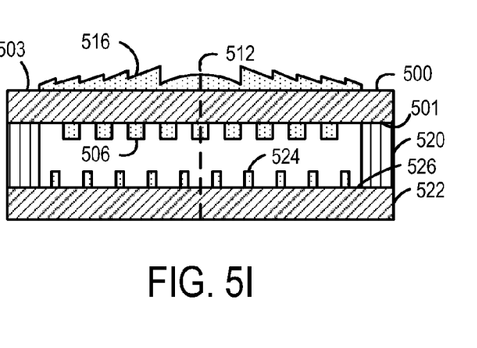

On the other hand, where additional optical elements are to be formed, then, as illustrated in FIG. 5E, a second amount 510 of UV curable polymer is administered to a second substrate surface 503 of substrate 500. The second substrate surface 503 may oppose first substrate surface 501 and correspondingly diffractive optical element 506. In FIG. 5F, a second UV transparent optical feature embossing mold 514 is applied to the second amount 510 of UV curable polymer. In the depicted embodiment, the second UV transparent optical feature embossing mold 514 is configured to emboss a Fresnel lens 516 into the second amount 510 of UV curable polymer. The second UV transparent optical feature embossing mold 514 may be applied to the second amount 510 of UV curable polymer such that Fresnel lens 516 is optically aligned with diffractive optical element 506 along optical axis 512. In FIG. 5G, second UV transparent optical feature embossing mold 514 and the second amount 510 of UV curable polymer that is held in the form of Fresnel lens 516 are illuminated by UV light 518 to set Fresnel lens 516. In FIG. 5H, second UV transparent optical feature embossing mold 514 is separated from Fresnel lens 516 after Fresnel lens 516 has cured. In some embodiments, where an optical component comprises two optical elements, the manufacturing process may end at this point.

Where additional optical elements are to be formed, then, as illustrated at FIG. 5I, first substrate 500, having Fresnel lens 516 and first diffractive optical element 506, may be aligned with a second substrate 522. The second substrate may comprise a second diffractive optical element 524 that is disposed in a polymer layer on a substrate surface of second substrate 522. In particular, Fresnel lens 516, first diffractive optical element 506, and second diffractive optical element 524 may be optically aligned along optical axis 512. The first substrate and the second substrate may be separated by a spacer 520. In some cases, during the manufacturing process, the substrates and the spacer may be stacked and optically aligned then bonded to form an optical component that may be implemented in a projector assembly of a depth sensing system.

Note that that above described manufacturing process may be applied to form virtually any suitable combination of optical elements on one or more substrates to create an optical component that may be implemented as a modular unit. For example, an optical component comprising a plurality of focusing lenses, a band-pass filter, and an aperture that may be coupled to a sensor in a sensor assembly may be formed using the above described manufacturing process.

Figure 6:
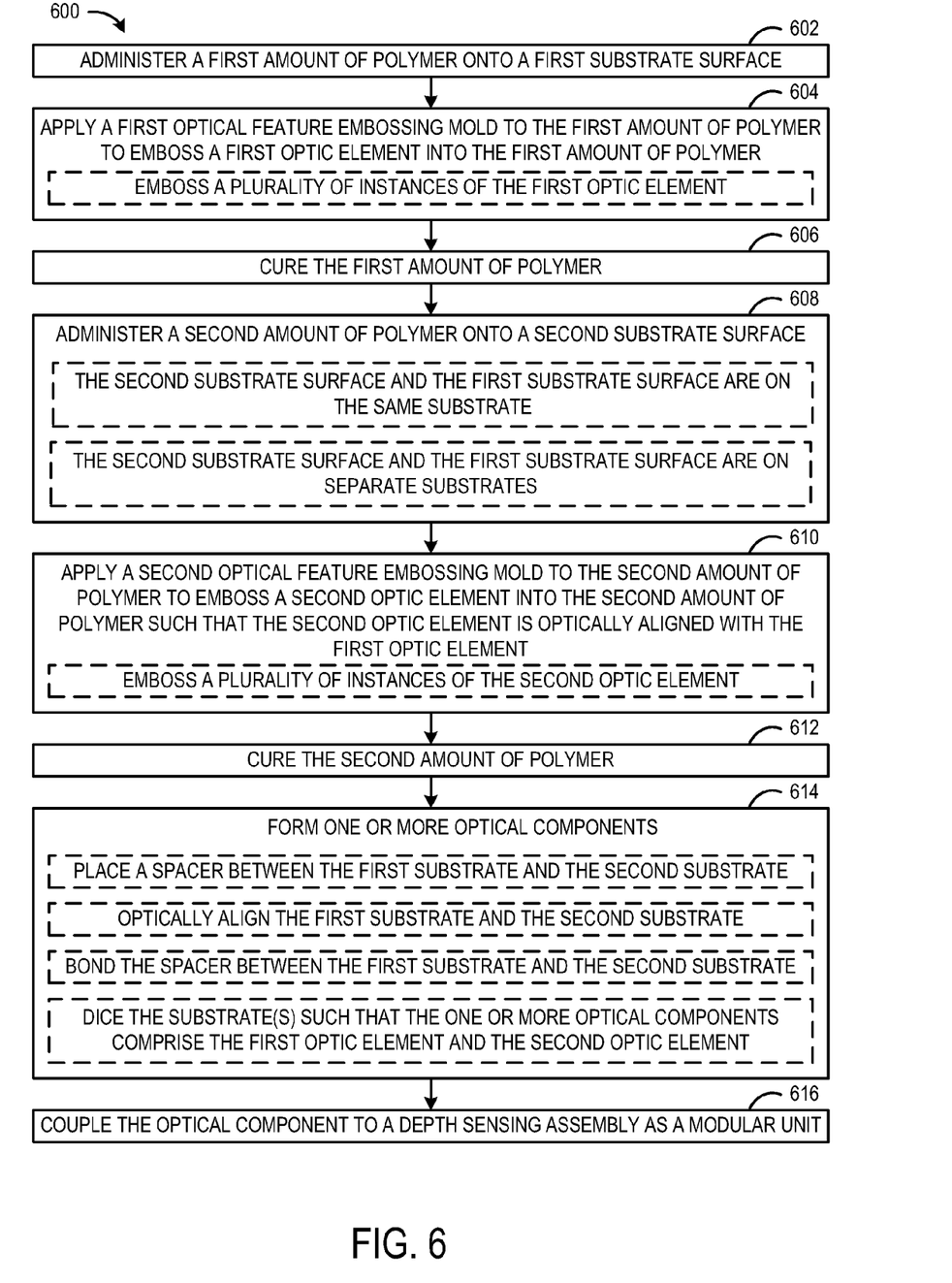
FIG. 6 is a flow diagram of an embodiment of a method for manufacturing an optical component for a structured light depth sensing system.

FIG. 6 is a flow diagram of an embodiment of a method 600 for manufacturing an optical component that may be used in a projector assembly or a sensor assembly of a depth sensing system. At 602, the method may comprise administering a first amount of polymer onto a first substrate surface. In some embodiments the first amount of polymer may be a UV curable polymer. Further, in some embodiments, the substrate may be formed from glass, while in other embodiments, the substrate may be formed from polymer.

At 604, the method may include applying a first optical feature embossing mold to the first amount of polymer to emboss a first optical element into the first amount of polymer. The first optical feature embossing mold may be configured to form any suitable optical element. For example, if an optical component for a projector assembly for a depth sensing system is being manufactured, the first optical feature embossing mold may form a collimating lens and/or a diffractive optical element. As another example, if an optical component for a sensor assembly is being manufactured, the first optical feature embossing mold may form one or more focusing lenses.

In some embodiments, applying may comprise of applying the first optical feature embossing mold to the first amount of polymer to emboss a plurality of instances of the first optical element. As discussed above with reference to FIG. 4 a plurality of optical elements may be formed on a substrate as opposed to being formed individually, which may reduce manufacturing costs.

At 606, the method may comprise curing the first amount of polymer. For example, if a single instance of the first optical element is molded into the first amount of polymer, then curing the first amount of polymer sets the first optical element in a polymer layer disposed on the first substrate surface. Likewise, if a plurality of instances of the first optical element is molded into the first amount of polymer, then curing the first amount of polymer sets the plurality of instances of the first optical element in a polymer layer disposed on the first substrate surface. In some embodiments, the first amount of polymer may be a UV-curable polymer. Thus, curing may comprise illuminating the first amount of polymer with UV light. Likewise, in some embodiments, the first amount of polymer may be a time cured polymer, a thermoset polymer, or a polymer that utilizes another curing method. It will be understood that any suitable curing process may be implemented to cure the first amount of polymer.

At 608, the method may comprise administering a second amount of polymer onto a second substrate surface. In some embodiments, the second substrate surface and the first substrate surface may be on the same substrate. In some embodiments, the second substrate surface and the first substrate surface may be on separate substrates.

At 610, the method may comprise applying a second optical feature embossing mold to the second amount of polymer to emboss a second optical element into the second amount of polymer such that the second optical element is optically aligned with the first optical element. In some embodiments, the second optical element may be the same type of optical element as the first optical element. In other embodiments, the second optical element may be a different type of optical element than the first optical element. For example, the first optical element may be a collimating lens and the second optical element each may comprise a diffractive optical element. As another example, the first optical element may comprise a first diffractive optical element and the second optical element may comprise a second diffractive optical element. As yet another example, the first optical element may comprise a first focusing lens and the second optical element may comprise a second focusing lens. Further, in some embodiments, a single instance of the second optical element may be embossed, while in other embodiments, a plurality of instances of the second optical element may be embossed. Then, at 612, the method may comprise curing the second amount of polymer, as described above for the first amount of polymer.

Continuing with FIG. 6, at 614, the method may comprise forming one or more optical components. In embodiments where the first substrate surface and the second substrate surface are on separate substrates, the first optical element may be formed on a first substrate and the second optical element may be formed on a second substrate. In such embodiments, forming an optical component may comprise placing one or more spacers between the first substrate and the second substrate, aligning the first substrate and the second substrate such that the first optical element is optically aligned with the second optical element, bonding the spacer between the first substrate and the second substrate, and dicing the substrates to form modular optical assemblies that each comprises a plurality of optical components. Likewise, in embodiments where the first substrate surface and the second substrate surface are on the same substrate, forming may comprise dicing the substrate to form optical components each comprising the first optical element and the second optical element.

At 616, the method may include coupling the optical component or components to a depth sensing assembly as a modular unit. For example, if the optical component assembly comprises a collimating lens and/or diffractive optical element, then the optical component may be coupled to a projector of a depth sensing system. Likewise, if the optical component comprises one or more focusing lenses, then the optical component may be coupled to a sensor of a depth sensing system. In the case of coupling to a depth sensor, this could be done on an individual basis or as a plurality of components to a plurality of sensors.

It will be understood that the configurations and/or approaches described herein for manufacturing optical assemblies for a structured light depth sensor are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A depth sensing system comprising:
a modular optical component comprising:
a first substrate comprising a first substrate surface;
a first optical element formed in a polymer layer disposed on the first substrate surface;
a second substrate comprising a second substrate surface;
a second optical element formed in a polymer layer disposed on the second substrate surface; and
a spacer, bonded between the first substrate and the second substrate, to maintain spacing and optical alignment between the first optical element and the second optical element;
a projector configured to provide light to form a pattern to illuminate a target; and
a sensor configured to acquire an image of the pattern as reflected from the target, wherein the modular optical component is coupled to the projector or the sensor.

2. The system of claim 1, wherein the first optical element comprises a collimating lens and the second optical element comprises a diffractive optical element.

3. The system of claim 2, wherein the collimating lens comprises a Fresnel lens.

4. The system of claim 2, wherein the diffractive optical element comprises a diffractive grating.

5. The system of claim 2, wherein the modular optical component is coupled to the projector.

6. The system of claim 1, wherein the first optical element is a first focusing lens and the second optical element is a second focusing lens.

7. The system of claim 6, wherein the modular optical component is coupled to the sensor.

8. The system of claim 6, further comprising:
a band-pass filter formed on the first substrate surface or the second substrate surface.

9. The system of claim 8, wherein the band-pass filter is formed on a substrate surface nearest the sensor.

10. The system of claim 6, further comprising:
an aperture formed on the first substrate surface or the second substrate surface.

11. The system of claim 1, wherein the first substrate is formed from a glass.

12. A method of manufacturing an optical component for a projector assembly of a depth sensor, comprising:
administering a first amount of polymer onto a first substrate surface of a first substrate;
applying a first optical feature embossing mold to the first amount of polymer to emboss a collimating lens into the first amount of polymer;
curing the first amount of polymer to set the collimating lens;
administering a second amount of polymer onto a second substrate surface of a second substrate;
applying a second optical feature embossing mold to the second amount of polymer to emboss a diffractive optical element
curing the second amount of polymer to set the diffractive optical element;
placing a spacer between the first substrate and the second substrate;
aligning the first substrate and the second substrate such that the collimating lens is optically aligned with the diffractive optical element;
bonding the spacer between the first substrate and the second substrate;
dicing the first substrate and the second substrate to form the optical component comprising the collimating lens and the diffractive optical element; and
coupling the optical component to a projector as a modular unit.

13. The method of claim 12, further comprising:
creating a plurality of collimating lenses on the first substrate surface; and
creating a plurality of diffractive optical elements on the second substrate surface, such that each of the plurality of diffractive optical elements is optically aligned with a corresponding collimating lens of the plurality of collimating lenses; and
dicing the first substrate and the second substrate to form a plurality of modular optical components comprising one of the plurality of collimating lenses and one of the plurality of diffractive optical elements.

14. The method of claim 13, further comprising:
dicing the first substrate and the second substrate to form a plurality of modular optical components, each of the plurality of modular optical components comprising one of the plurality of collimating lenses and one of the plurality of diffractive optical elements.

15. A depth sensing system comprising:
a projector configured to provide light to form a pattern to illuminate a target;
a sensor to acquire an image of the pattern;
a first optical component coupled to the projector as a first modular unit comprising:
a first substrate comprising a first substrate surface;
a collimating lens, to focus light provided by the projector, the collimating lens being formed in a polymer layer disposed on the first substrate surface;
a second substrate comprising a second substrate surface;
a diffractive optical element, comprising a diffractive grating to receive light focused by the collimating lens to at least partially form the pattern, the diffractive optical element being formed in a polymer layer disposed on the second substrate surface; and
a first spacer, bonded between the first substrate and the second substrate, to maintain optical alignment between the collimating lens and the diffractive optical element, the collimating lens and the diffractive optical element being optically aligned to focus light provided by the projector to form the pattern illuminated on the target; and
a second optical component coupled to the sensor as a second modular unit comprising:
a third substrate comprising a third substrate surface;
a first focusing lens formed in a polymer layer disposed on the third substrate surface;
a fourth substrate comprising a fourth substrate surface;
a second focusing lens formed in a polymer layer disposed on the fourth substrate surface;
a second spacer, bonded between the third substrate and the fourth substrate, to maintain optical alignment between the first focusing lens and the second focusing lens;
an aperture formed on the third substrate surface or the fourth substrate surface; and
a band-pass filter formed on the third substrate surface or the fourth substrate surface that is nearest the sensor, the first focusing lens and the second focusing lens being optically aligned to collectively focus the pattern illuminated on the target through the band-pass filter to be acquired by the sensor.

16. The system of claim 2, wherein the diffractive optical element is a first diffractive optical element, wherein
the second substrate further comprises a third substrate surface that is opposed to the second substrate surface, and wherein
a second diffractive optical element is formed in a polymer layer disposed on the third substrate surface, the first diffractive optical element and the second diffractive optical element being optically aligned to collectively form the pattern to illuminate the target.

17. The method of claim 12, further comprising:
administering a third amount of polymer onto a third substrate surface of a third substrate;
applying a third optical feature embossing mold to the third amount of polymer to emboss a first focusing lens into the third amount of polymer;
curing the third amount of polymer to set the first focusing lens;
administering a fourth amount of polymer onto a fourth substrate surface of a fourth substrate;
applying a fourth optical feature embossing mold to the fourth amount of polymer to emboss a second focusing lens;
curing the fourth amount of polymer to set the second focusing lens;
placing a spacer between the third substrate and the fourth substrate;
aligning the third substrate and the fourth substrate such that the first focusing lens is optically aligned with the second focusing lens;

bonding the spacer between the third substrate and the fourth substrate;

dicing the third substrate and the fourth substrate to form a modular optical component comprising the first focusing lens and the second focusing lens; and coupling the modular optical component to a sensor.

18. The method of claim 12, wherein the diffractive optical element is a first diffractive optical element, and wherein the method further comprises:

administering a third amount of polymer onto a third substrate surface of the first substrate that is opposed to the first substrate surface;

applying a third optical feature embossing mold to the third amount of polymer to emboss a second diffractive optical element into the third amount of polymer such that the collimating lens is optically aligned with the second diffractive optical element.

19. The system of claim 15, wherein the diffractive optical element is a first diffractive optical element, wherein the second substrate further comprises a fifth substrate surface that is opposed to the second substrate surface, and wherein a second diffractive optical element is formed in a polymer layer disposed on the fifth substrate surface, the diffractive optical element and the second diffractive optical element being optically aligned to collectively form the pattern to illuminate the target.

* * * * *